United States Patent [19]
Anderson

[11] 4,186,318
[45] Jan. 29, 1980

[54] PRIME MOVER AND METHOD OF ASSEMBLING A DEVICE THERETO

[75] Inventor: Wesley K. Anderson, DeKalb, Ill.

[73] Assignee: General Electric Company, Fort Wayne, Ind.

[21] Appl. No.: 835,661

[22] Filed: Sep. 22, 1977

[51] Int. Cl.² .......................................... H02K 11/00
[52] U.S. Cl. ................................. 310/68 C; 310/91; 318/782; 361/25
[58] Field of Search ................. 310/68 C, 191, 68 R, 310/259, 71, 260; 318/221 C, 221 H, 473, 781, 782, 791; 361/25-27, 41; 174/138 G

[56] References Cited
U.S. PATENT DOCUMENTS

| | | | |
|---|---|---|---|
| 2,279,214 | 4/1942 | Veinott | 310/68 C |
| 2,682,005 | 6/1954 | Hemphill | 310/68 C |
| 3,155,877 | 11/1964 | Jensen | 318/473 |
| 3,351,790 | 11/1967 | Linkous | 310/68 R |
| 3,875,439 | 4/1975 | Roach | 310/68 C |
| 4,061,935 | 12/1977 | Kandpal | 310/71 |

*Primary Examiner*—R. Skudy
*Attorney, Agent, or Firm*—Joseph E. Papin

[57] ABSTRACT

A prime mover has a stationary assembly with a generally annular grouping of winding end turns extending therefrom, and a structural member of the prime mover is spaced from the winding end turn grouping. An overload protector device is disposed in abutting engagement with a part of the winding end turn grouping, and means is associated with both the stationary assembly and the overload protector device and arranged in biasing engagement with the structural member for positioning the overload protector device in the abutting engagement thereof with the part of the winding end turn grouping.

A method of assembling a device with the prime mover is also disclosed.

24 Claims, 10 Drawing Figures

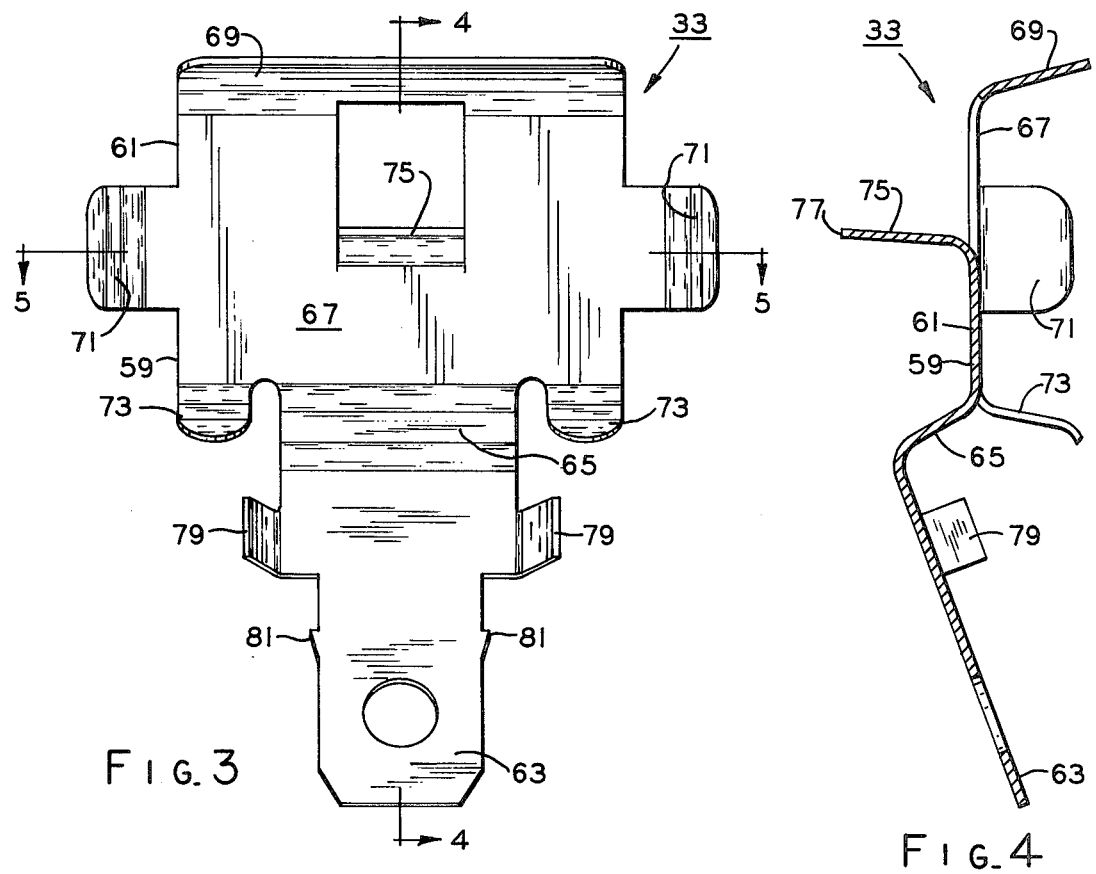
FIG. 3
FIG. 4
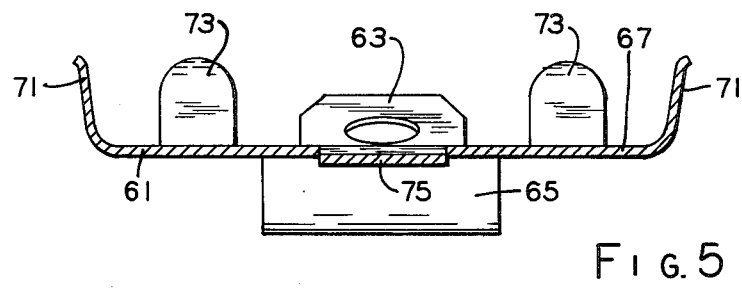
FIG. 5
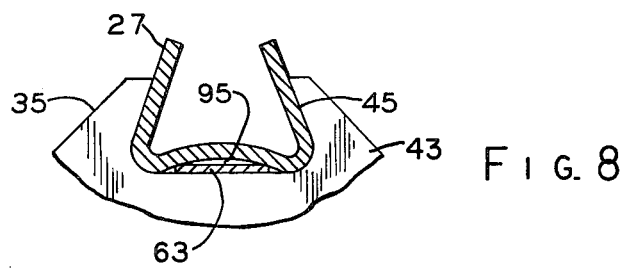
FIG. 8

PRIME MOVER AND METHOD OF ASSEMBLING A DEVICE THERETO

FIELD OF THE INVENTION

This invention relates in general to electrical apparatus and in particular to prime movers and a method of assembling a device thereto.

BACKGROUND OF THE INVENTION

Prime movers, such as dynamoelectric machines or particularly electric motors of the single phase induction type, utilize thermal overload protectors operable generally to protect a winding circuit of such prime movers by deenergizing the windings of such winding circuit so as to interrupt current flow thereto in the event the windings for some reason become overheated, as may happen upon the occurrence of a current overload condition for instance. These current overloads are mounted generally adjacent to a grouping of winding end turns of the prime mover windings for sensing the ambient temperature adjacent thereto.

In U.S. Pat. No. 3,875,439, an electric motor is provided within a stator having an end face with a generally annular grouping of winding end turns extending therefrom, and a plurality of beams which extend past the stator end face in spaced relation with the end turn grouping are retained in a plurality of grooves provided therefor in the stator. A metallic clip has a mounting portion which is disposed in one of the stator grooves in displacement preventing engagement with the stator, and a flange or the like is integrally formed with the mounting portion being bent from the plane thereof so as to support or maintain an overload protector in abutment with the winding end turn grouping for sensing the ambient temperature adjacent thereto.

SUMMARY OF THE INVENTION

Among the several objects of the present invention may be noted the provision of an improved prime mover and an improved method of assembling an overload protector device with such prime mover; the provision of such prime mover and method utilizing a means associated with a stationary assembly of the prime mover for positioning the overload protector device on the prime mover and which positioning means offers not only a greater resistance to its displacement but also a greater minimum force for urging the overload protector device against a grouping of winding end turns of the stationary assembly; the provision of such prime mover and method in which the positioning means provides generally uniform intimate contact of the overload protector device with the winding end turn grouping of the stationary assembly; and the provision of such prime mover which is simplistic in design, easily assembled, and economically manufactured. These as well as other objects and advantageous features of the present invention will be in part apparent and in part pointed out hereinafter.

In general and in one form of the invention a prime mover has a stationary assembly with a generally annular grouping of winding end turns extending therefrom, and a structural member of the prime mover is spaced from the winding end turn grouping. An overload protector device is disposed in abutting engagement with a part of the winding end turn grouping, and means is associated with both the stationary assembly and the overload protector device and arranged in biasing engagement with the structural member for positioning the overload protector device in the abutting engagement thereof with the part of the winding end turn grouping.

Also in general, a method is provided in one form of the invention for assembling an overload protector device with a grouping of winding end turns disposed adjacent an end of a stationary assembly for a prime mover and with the prime mover having a structural member disposed at least in part adjacent the end of the stationary assembly in spaced relation with the winding end turn grouping. In this method, means for positioning the overload protector device is mounted with it and at least the stationary assembly so as to dispose the overload protector device in engagement with a part of the winding end turn grouping, and means on the positioning means is biased into abutting engagement with the structural member for urging the positioning means and the overload protector device in a direction generally toward the part of the winding end turn grouping to enhance the engagement of the overload protector device therewith.

BRIEF DESCRIPTION OF THE DRAWINGS

FIG. 3 is a plan view of a means for positioning a sensing device on the prime mover;

FIGS. 4 and 5 are sectional views taken along lines 4—4 and 5—5 of FIG. 3, respectively;

FIG. 8 is a sectional view taken along line 8—8 of FIG. 7; and

Corresponding reference characters indicate corresponding parts throughout the several views of the drawings.

The exemplifications set out herein illustrate the preferred embodiment of the invention in one form thereof, and such exemplifications are not to be construed in any manner as limiting the scope of the invention or of the disclosure thereof as set forth hereinafter.

DETAILED DESCRIPTION OF THE PREFERRED EMBODIMENT

Figure 1:
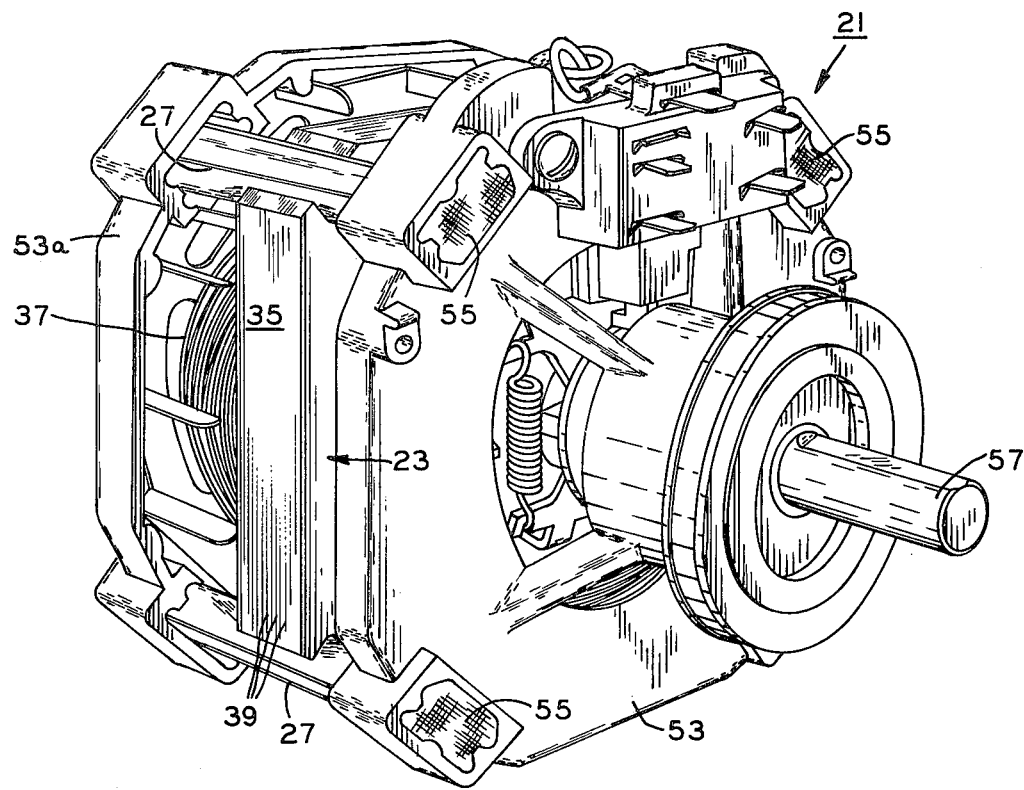
FIG. 1 is a perspective view of a prime mover in one form of the invention.
Figure 2:
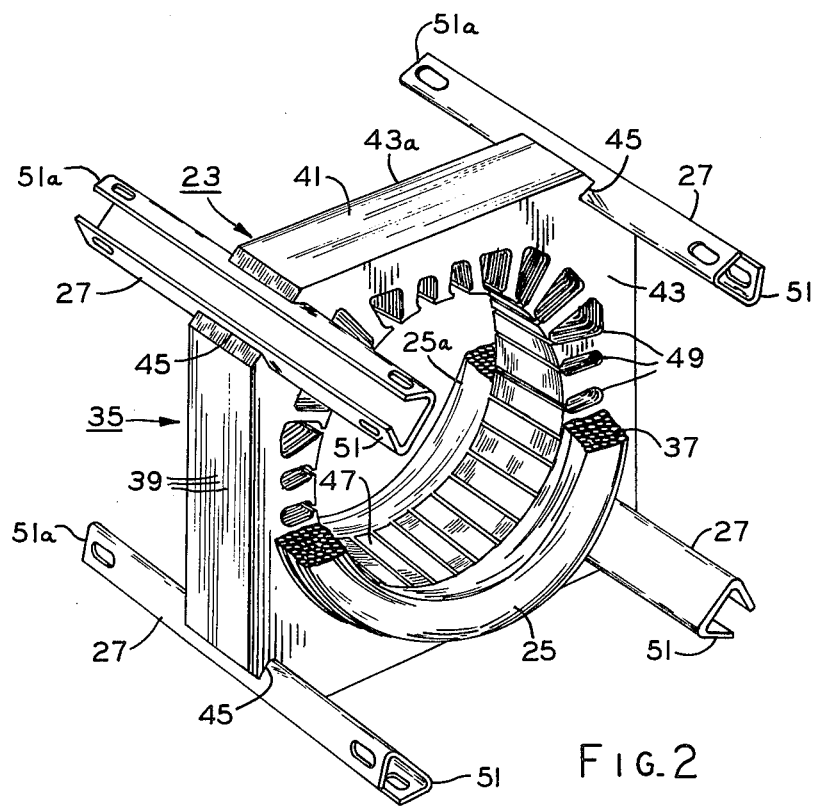
FIG. 2 is a perspective view of a part of a stationary assembly of the prime mover.

With reference in general to the drawings, a prime mover, such as for instance an electric motor 21, is shown in one form of the invention having a stationary assembly 23 with a generally annular grouping of winding end turns 25 extending therefrom, and a structural member 27 of the prime mover is spaced from the winding end turn grouping (FIGS. 1 and 2). An overload protector device 29 is disposed in abutting engagement with a part, indicated generally at 31, of winding end turn grouping 25, and means, such as a bracket 33, is associated with both stationary assembly 23 and overload protector device 29 and also arranged in biasing engagement with structural member 27 for positioning the overload protector device in the abutting engagement thereof with the part of winding end turn grouping (FIGS. 6-10).

More particularly and with specific reference to FIGS. 1 and 2, stationary assembly 23 comprises a stator 35 carrying a plurality of windings or winding coils, indicated generally at 37, which are adapted for energization. Stator 35 is formed of a plurality of stacked laminations 39 of magnetic material, such as electrical grade sheet stock for instance, and such laminations may be retained in this stack by suitable means, such as welding, keying, clamping or other assembly means well known to the art (not shown). While stator 35 is illustrated as being formed by a plurality of stacked laminations, it is contemplated that a unitary or pressed-type stator having metallic particles or powder bonded together may be utilized within the scope of the present invention so as to meet the objects and advantageous features thereof. Stator 35 has a peripheral or radially outer surface 41 intersecting or interposed between a pair of opposite stator ends or end faces 43, 43a, and a plurality of openings, such as grooves or recess means 45, are provided in the stator intersecting with the outer surface and the end faces thereof, respectively. While openings 45 are described herein as intersecting with outer surface 41 of stator 35, it is contemplated that a stator may be provided with other such openings which do not intersect with the outer surface thereof within the scope of the invention so as to meet the objects and advantageous features thereof. A bore 47 is provided generally centrally and axially through stator 35 intersecting with opposite end faces 43, 43a thereof and a plurality of slots 49 in which winding plurality 37 is received are also provided through the stator intersecting with the bore and the opposite end faces. Winding plurality 37 is disposed in stator slots 49 so that one of the end turn grouping 25 thereof is arranged in the aforementioned generally annular configuration adjacent stator end face 43 so as to extend therefrom, and another end turn grouping 25a of the winding plurality is also arranged in a generally annular configuration adjacent stator end face 43a so as to extend therefrom in a direction generally opposite end turn grouping 25.

Structural member 27, as mentioned hereinbefore, is illustrated as one of a plurality of beams or the like which are disposed in stator openings 45 in displacement preventing engagement with stator 35, and a pair of oppositely extending ends or end portions 51, 51a of each beam 27 protrudes axially beyond opposite end faces 43, 43a of the stator so as to be disposed in spaced relation, i.e., generally radially spaced, with respect to opposite end turn groupings 25, 25a of winding plurality 37, respectively. If a more detailed discussion of beams 27 and the attachment thereof to stator 35 is desired, reference may be had to U.S. Pat. Nos. 3,807,040 and 3,867,654 issued to Charles W. Otto on Apr. 30, 1974 and Feb. 18, 1975, respectively, which are each incorporated herein by reference. The free or opposite end portions 51, 51a of beams 27 are connected in supporting engagement with a pair of opposite end plates or frames 53, 53a of prime mover 21 by suitable means, such as a hardenable material 55, and a rotor supporting shaft 57, which extends generally coaxially through stator bore 47, has its opposite ends suitably journaled in the end plates. If a more detailed discussion of end frames 53, 53a and their attachment to opposite end portions 51, 51a of beams 27 is desired, reference may be had to U.S. Pat. Nos. 3,844,024 and 3,858,067 issued to Charles W. Otto on Oct. 29, 1974 and Dec. 31, 1974, respectively, which patents are each incorporated herein by reference. Further, although beams 27 have been described above as having a particular attachment to stator openings 45 and end plates 53, 53a, it is contemplated that the structural components of a prime mover may be interconnected in different manners well known to the art within the scope of the invention so as to meet the objects and advantageous features thereof. For instance, the well known through-bolt construction may be utilized to interconnect a stator within a motor frame between opposite end plates, or an epoxy may be utilized to interconnect the stator and end frames.

Figure 9:
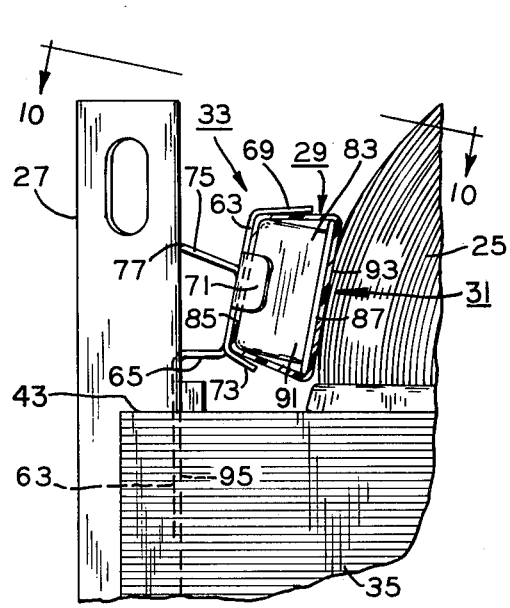
FIGS. 9 and 10 are fragmentary perspective views showing the positioning means associated with the sensing device and the stationary assembly of the prime mover with the sensing device being urged toward abutment with a grouping of winding end turns of the stationary assembly, respectively.
Figure 10:
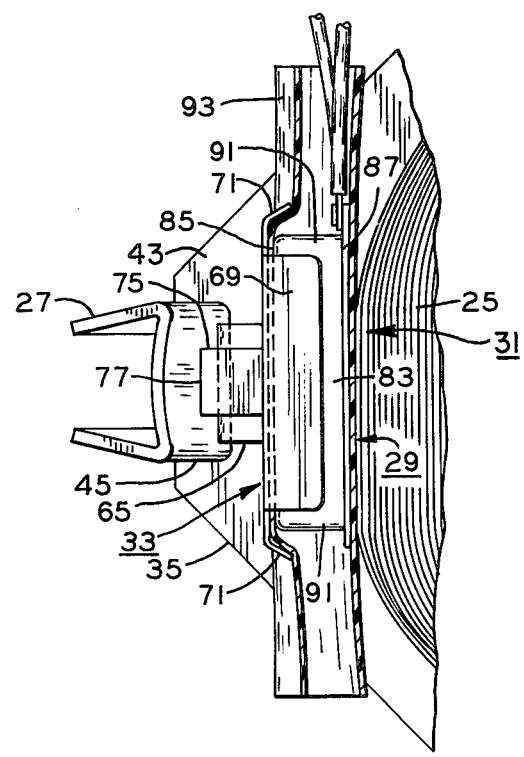

Referring now to FIGS. 3-5, bracket or mounting clip 33 is stamped or otherwise formed from a generally thin sheet metal strip, but it is contemplated that such bracket may be of other suitable material, such as a plastic or the like for instance, and may be formed by different methods, such as molding for instance, within the scope of the invention so as to meet the objects thereof. Bracket 33 is provided with a body 59 having a pair of generally planar, oppositely spaced cradle and mounting portions 61, 63 integrally interconnected by a bent or off-set intermediate portion 65 which not only adds strength to the bracket but also provides a predetermined off-set or angularity between the general planes of the cradle and mounting portions. Cradle or cradle portion 61 is provided with a generally flat seating surface 67 on which overload protector device 29 is adapted to be seated or received, and the upper margin or end of the cradle is bent of otherwise deformed from the general plane of the cradle so as to form a lip or finger 69 adapted for embracing or grippingly engaging the overload protector device. Pairs of fingers 71, 73 are respectively integrally provided on the opposite side edges of cradle 61 and on the lower margin or end thereof opposite lip 69, and the finger pairs 71, 73 are also bent or otherwise deformed from the general plane of the cradle for embracing or grippingly engaging overload protector device 29. Thus, when overload protector device 29 is abutted between seating surface 67 of cradle 61 and end turn grouping 25 (as best seen in FIGS. 9 and 10), lip 69 and finger pairs 71, 73 embrace the overload protector device so as to generally maintain it against displacement movement from its seated or located position on the seating surface of the cradle. An urging means or displacement opposing means, such as a tab or flange 75 or the like, is lanced or otherwise in part separated from cradle 61 generally centrally thereof, and the urging means or tab is bent or otherwise deformed so as to extend from the general plane of the cradle at a preselected angle therewith. A free or distal end or portion 77 is thus provided on tab 75, and the free end is adapted for abutting or interferring fitting engagement with a beam 27 when bracket 33 is mounted to stator 35, as discussed hereinafter. Mounting portion 63 of bracket 33 is provided with a pair of oppositely extending locating, reference or insertion limiting means, such as projections or arms 79, which are integrally formed on the opposite side edges of the mounting portion and predeterminately disposed with respect to intermediate portion 65 of the bracket for abutment with stator end face 43 so as to limit the extent of the engagement of the bracket with stator 35, as discussed hereinafter. To complete the description of bracket 33, locking or displacement preventing means, such as a pair of oppositely extending barbs or serrations 81, are integrally provided on the opposite side edges of mounting portion 63 for locking or displacement preventing engagement with stator 35 when the bracket is mounted thereto as discussed hereinafter.

Overload protector device 29 is provided with a casing 83 which, as seen best in FIGS. 9 and 10, has a pair of opposite face walls 85, 87 interconnected by a plurality of sidewalls 91, and the casing is enveloped by a sleeve 93 of of insulating material, such as Mylar insulation for instance. Overload protector device 29 is available from Texas Instruments, Inc., Dallas, Tex. under Catalog No. 8AM. Thus, insulation sleeve 93 is interposed between casing 83 of overload protector device 29 and cradle 61 of bracket 33 when the overload protector device is mounted therewith, and lip 69 and finger pairs 71, 73 depress the confronting portions of the insulation sleeve so as to embrace or grippingly engage sidewall plurality 91 of the casing. Of course, if either bracket 33 or casing 83 is formed from a dielectric material, it is not necessary to envelope overload protector device 29 in insulation sleeve 93. When the overload protector device 29 is mounted in prime mover 21 in abutment with winding end turn grouping 25 thereof and windings 37 are excited so as to energize the prime mover, the overload protector device is operable generally as a means for sensing ambient temperature adjacent the winding end turn grouping, and in the event of the occurrence of a current overload condition, the overload protector device operates to isolate or effect the deenergization of the windings so as to protect them against the deleterious affects of such current overload condition.

Figure 6:
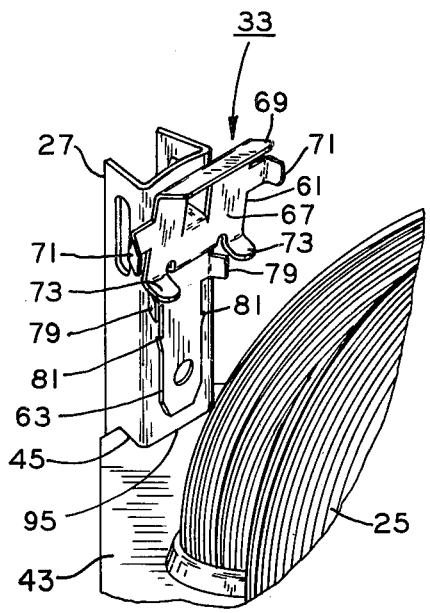
FIGS. 6 and 7 are fragmentary perspective views teaching principles which may be utilized in a method of assembling the sensing device to the prime mover in one form of the invention with the sensing device omitted for clarity.
Figure 7:
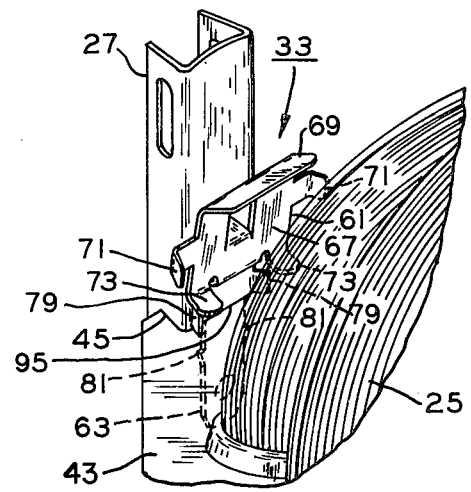

In the assembly of bracket 33 with stator 35 as best seen in FIGS. 6–8, the bracket is initially positioned with its mounting portion or section 63 against beam 27 above stator opening 45 with free end 77 of cradle tab 75 disposed adjacent the beam, and the bracket is then forced or pushed downwardly in order to insert the mounting portion of the bracket into a mounting space or recess 95 provided therefor between the beam and the stator opening, as best seen in FIG. 8. Upon the insertion of mounting portion 63 on bracket 33 into mounting space 95, projections 79 of the bracket are conjointly moved therewith into locating or abutting engagement with stator end face 43 about stator opening 45 thereby to define the mounted or assembled extent of insertion of the mounting portion into mounting space 95 between beam 27 and stator opening 45. When the mounting portion 63 of bracket 33 is so inserted mounting space 95, barbs 81 on the mounting portion are forced into locking or interferring fitting engagement with at least one of the laminations of stator 35 thereby to oppose displacement movement of the mounting portion from its assembled position within mounting space 95.

For the sake of clarity, the above described mounting of the bracket 33 to stator 35 did not consider the disposition of overload protector device 29 and its insulating sleeve 93 in its assembled or mounted position with respect to cradle 61 of the bracket and winding end turn grouping 25. However, prior to the arrangement of bracket 33 into its assembled or assembly position on prime mover 21, overload protector device 29 and its insulating sleeve 93 are disposed or otherwise supported on the bracket so that face wall 85 of casing 83 is seated against seating surface 67 on cradle 61 of the bracket and sidewalls 91 of the casing are embraced by lip 69 and finger pairs 71, 73 on the cradle. Of course, it is understood that insulating sleeve 93 is interposed between casing 83 of overload protector device 29 and cradle 61 of bracket 33, as previously discussed. With casing 83 held in its position in cradle 61 of bracket 33 so as to prevent displacement movement therebetween, the bracket is forced downwardly into its assembled position as previously described. Upon such downward movement of bracket 33, face wall 87 of overload protector device 29 is engaged in abutment with a part of winding end turn grouping 25, and such engagement stresses the bracket causing cradle 61 thereof to resil generally about its intermediate portion 65 so as to move free end 77 of cradle tab 75 into abutment or interferring fitting engagement with beam 27 at least when mounting portion 63 of the bracket is disposed in its assembled position within mounting space 95 therefor, as previously described. Therefore, when cradle tab 75 is so engaged with beam 27, the abutment or interferring fitting engagement therebetween acts to create a force in opposition to the displacement or upward movement of bracket 33 from its assembled position, and it may be noted that the cradle tab is disposed at a preselected angle of engagement or angular relation with the beam so as to cause a wedging action therebetween in the event of any displacement or upward movement of the bracket from its assembled position. Further, the engagement of cradle tab 75 with beam 27 not only establishes at least a minimum force for urging overload protector device 29 against winding end turn grouping 25 but also serves to resist any twisting force which may be exerted on cradle 61 of the bracket. Thus, it is believed that bracket 33 in the assembled position thereof urges overload protector device 29 into a generally uniform intimate contact or engagement with a confronting part or portion of winding end turn grouping 21.

In view of the foregoing and referring again in general to the drawings, there is illustrated in one form of the invention a method of assembling overload protector device 29 with winding end turn grouping 25 disposed adjacent end face 43 of stationary assembly 23 for prime mover 21 and with the prime mover having structural member 27 disposed at least in part adjacent the end face of the stationary assembly. In this method, means, such as bracket 33, for positioning overload protector device 29 is mounted with it and at least stationary assembly 23 so as to dispose the overload protector device in engagement with a part of winding end turn grouping 25, and means, such as tab 75, on the positioning means or bracket 33 is biased into abutting engagement with structural member 27 for urging the bracket and the overload protector device in a preselected direction generally toward the part of the winding end turn grouping to enhance the engagement of the overload protector device therewith.

From the foregoing, it is now apparent that a novel prime mover 21 and a novel method of assembling are provided meeting the objects and advantageous features set out hereinabove, as well as others, and that modifications or changes as to the precise configurations, shapes and details of the components of the prime mover, as well as the steps and precise order thereof, may be made by those having ordinary skill in the art without departing from the spirit of the invention or the scope thereof as set out by the claims which follow.

What I claim as new and desire to secure by Letters Patent of the United States is:

1. A prime mover comprising a stator having a pair of opposite end faces, a peripheral surface on said stator intersecting with said end faces, respectively, a plurality of windings adapted for energization disposed in said stator including a generally annular grouping of winding end turns extending from said stator adjacent one of said end faces and spaced generally radially inwardly of said peripheral surface of said stator, an opening in said stator at least adjacent said peripheral surface thereof and intersecting with at least said one end face, a structural member of the prime mover disposed in said opening and extending therefrom past said one end face in spaced relation with said winding end turn grouping, a space between confronting surfaces of said opening and said structural member disposed therein, means for sensing ambient temperature adjacent said winding end turn grouping and operable generally to effect deenergization of said windings in the event of the occurrence of a current overload condition, and means associated with said stator and said sensing means for positioning said sensing means in abutting engagement with a part of said winding end turn grouping including a body portion having a pair of generally opposite end portions, an intermediate portion integrally interconnected between said opposite end portions so as to offset said opposite end portion generally in different planes from each other, one of said opposite end portions being inserted into said space so as to be disposed in displacement preventing engagement with at least said stator, means on said body portion disposed in abutting engagement with said one end face for positively limiting the insertion of said one opposite end portion into said space, the other of said end portions being disposed generally between said structural member and said part of said winding end turn grouping and in supporting engagement with said sensing means, and means on said other end portion extending therefrom into abutting engagement with said structural member for urging said other end portion in a direction generally toward said part of said winding end turn grouping so as to bias said sensing means into engagement therewith.

2. In a prime mover having a stationary assembly supporting adjacent an end thereof a grouping of winding end turns, a structural member of the prime mover disposed at least in part generally beyond the end of the stationary member in spaced relation with the winding end turn grouping, means for sensing the ambient temperature generally adjacent the winding end turn grouping, and means associated with the sensing means and at least the stationary assembly for positioning the sensing means in engagement with a part of the winding end turn grouping; the improvement comprising means disposed between the structural member and the positioning means for urging the positioning means generally toward the part of the winding end turn grouping so as to bias the sensing means into its engagement therewith.

3. In the prime mover as set forth in claim 2 wherein said urging means comprises a tab integrally connected with the positioning means and extending therefrom into abutment with the structural member.

4. In the prime mover as set forth in claim 2 further comprising means disposed about the sensing means for insulating it from the part of the winding end turn grouping and the positioning means.

5. In the prime mover as set forth in claim 2 wherein the positioning means includes a portion disposed in mounting engagement with at least the stationary assembly, another portion associated with the sensing means so as to engage it against the part of the winding end turn grouping and the another portion being integral with the first named portion and predeterminately offset therefrom so as to effect a predetermined angle of interface between the sensing means and the part of the winding end turn grouping, and said urging means being integral with the another portion.

6. In the prime mover as set forth in claim 2 wherein the sensing means has a casing with a pair of opposite wall means respectively interconnected between a plurality of side wall means and wherein the improvement further comprises a plurality of means on the positioning means for embracing the side wall means plurality of the casing, respectively.

7. In the prime mover as set forth in claim 6 wherein the sensing means further has a sleeve of yieldable insulating material disposed about the casing, said embracing means plurality being engaged with the sleeve so that confronting parts thereof are displaced and held between said embracing means plurality and the side wall means plurality, respectively.

8. In a prime mover having a stationary assembly, a generally annular grouping of winding end turns extending from the stationary assembly, a structural member of the prime mover spaced from the winding end turn grouping, an overload protector device disposed in abutting engagement with a part of the winding end turn grouping, means associated with at least the stationary assembly and the overload protector device for positioning the overload protector device in the abutting engagement thereof with the part of the winding end turn grouping; the improvement wherein the positioning means comprises means integral therewith and extending into engagement with the structural member for urging the positioning means in a direction so as to maintain the abutting engagement of the overload protector with the part of the winding end turn grouping.

9. In the prime mover as set forth in claim 8 wherein said urging means comprises a tab lanced and bent from said positioning means and having a free end disposed in the abutting engagement with the structural member.

10. In a prime mover having a stationary assembly; winding means adapted for energization disposed in the stationary assembly and having a grouping of end turns extending from the stationary assembly; a structural member of the prime mover disposed in spaced relation with respect to the end turn grouping; a device operable generally to effect the deenergization of the winding means in the event of the occurrence of a current overload condition and including a casing disposed in an assembled position in abutment with a part of the end turn grouping; means associated with the stationary assembly and the device for positioning the casing in its assembled position: the improvement comprising means on the positioning means and extending therefrom in a direction generally away from the end turn grouping into interferring fitting engagement with the structural member for urging a part of the positioning means and the casing generally toward the end turn grouping so as to dispose the casing in its assembled position in abutment with the end turn grouping.

11. A method of assembling an overload protector device with a grouping of winding end turns disposed adjacent an end of a stationary assembly for a prime mover and with the prime mover having a structural member disposed at least in part adjacent the end of the stationary assembly in spaced relation with the winding end turn grouping, the method comprising: mounting a means for positioning the overload protector device with it and at least the stationary member so as to dispose the overload protector device in engagement with a part of the winding end turn grouping and biasing a means on the positioning means into abutting engagement with the structural member for urging the positioning means and the overload protector device in a preselected direction generally toward the part of the winding end turn grouping to enhance the engagement of the overload protector device therewith.

12. The method as set forth in claim 11 wherein the mounting and biasing step includes securing a part of the positioning means in displacement preventing engagement with the stationary assembly.

13. The method as set forth in claim 11 wherein the mounting and biasing step includes disposing the urging means in interferring fitting engagement with the structural member so as not only to urge the positioning means in the preselected direction but also to oppose displacement movement of the positioning means from its mounting with the stationary assembly.

14. The method as set forth in claim 11 wherein the mounting and biasing step includes exerting a preselected minimum force to effect the engagement of the overload protector device with the part of the winding end turn grouping, the force acting on the overload protector device through the urging means upon the abutting engagement thereof with the structural member.

15. The method as set forth in claim 11 comprising the preliminary step of deforming the urging means from the positioning means and displacing the urging means so as to extend generally at a preselected angle from the positioning means.

16. In a prime mover having a stationary assembly with at least one generally annular grouping of winding end turns and a structural member, an overload protector device engaged with a confronting portion of the winding end turn grouping, a bracket arranged in an assembly position on the prime mover with the bracket having a first part disposed in engagement with at least a part of at least one of the stationary assembly and the structural member and a second part disposed so as to support the overload protector device in the engagement thereof with the confronting portion of the at least one winding end turn grouping; the improvement comprising a flange integral with the second part of the bracket and extending therefrom generally toward the structural member when the bracket is in its assembly position, a distal end on said flange arranged generally in an angular relation with the structural member and in interfering fitting engagement therewith so as to at least oppose displacement of the first part of the bracket from the engagement thereof with the at least part of the at least one of the stationary assembly and the structural member when the bracket is in its assembly position, and said flange urging the second part of said bracket generally in a direction so as to maintain the engagement of the overload protector device with the confronting portion of the at least one winding end turn grouping when said distal end of said flange is in the interfering fitting engagement thereof with the structural component.

17. In a prime mover having a stationary assembly with a generally annular grouping of winding end turns and a structural member arranged at least in part in spaced relation with the winding end turn grouping, an overload protector device engaged with the winding end turn grouping, a bracket arranged in an assembly position in engagement with at least a part of at least one of the stationary assembly and the structural member so as to support the overload protector device in the engagement thereof with the winding end turn grouping; the improvement comprising means extending from the bracket and having a distal portion arranged in interfering fitting engagement with the structural member for at least opposing displacement of the bracket from its engagement with the at least part of the at least one of the stationary assembly and the structural member when the bracket is in its assembly position, and said displacement opposing means urging at least a part of the bracket generally in a direction so as to maintain the engagement of the overload protector device with the winding end turn grouping when said distal portion of said displacement opposing means is in the interfering fitting engagement thereof with the structure member.

18. In the prime mover as set forth in claim 17 wherein said displacement opposing means comprises a flange integral with the bracket.

19. In the prime mover as set forth in claim 17 wherein said at least part of the bracket includes means for supporting the overload protector device in the engagement thereof with the winding end turn grouping.

20. In the prime mover as set forth in claim 17 wherein at least said distal portion of said displacement opposing means is arranged generally in angular relation with the structural member.

21. In a prime mover having a stationary assembly with at least one grouping of winding end turns and a member arranged at least in part in spaced relation with the at least one winding end turn grouping, an overload protector, means arranged in an assembly position on the prime mover for positioning the overload protector device in engagement with a confronting portion of the at least one winding end turn grouping and including means for engagement with at least a part of at least one of the stationary assembly and the member; the improvement comprising flange means on the positioning means and extending therefrom generally toward the member for wedging engagement therewith when the positioning means is in its assembly position so as to establish forces in opposition to displacement of the engagement means from its engagement with the at least part of the at least one of the stationary assembly and the member and in opposition to displacement of the positioning means generally in a direction away from the overload protector device when it is engaged with the confronting portion of the at least one winding end turn grouping, respectively.

22. In the prime mover as set forth in claim 21 wherein said flange means extends from the positioning means so as to be arranged generally in an angular relation with the member.

23. In the prime mover as set forth in claim 21 wherein said flange means comprises a tab integral with the positioning means and extending therefrom toward the member.

24. In the prime mover as set forth in claim 21 wherein said flange means is lanced from the positioning means and includes a free end arranged in the wedging engagement with the member.

* * * * *